United States Patent
Hong et al.

(10) Patent No.: US 11,811,512 B2
(45) Date of Patent: Nov. 7, 2023

(54) MULTICAST ROUTING METHOD, INTERCONNECTION DEVICE, MESH NETWORK SYSTEM AND CONFIGURATION METHOD THEREOF

(71) Applicant: Shanghai Biren Technology Co., Ltd, Shanghai (CN)

(72) Inventors: Zhou Hong, Shanghai (CN); Qin Zheng, Shanghai (CN); Yuzhe Li, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 2 days.

(21) Appl. No.: 17/858,014

(22) Filed: Jul. 5, 2022

(65) Prior Publication Data

US 2023/0027355 A1    Jan. 26, 2023

(30) Foreign Application Priority Data

Jul. 19, 2021  (CN) .......................... 202110811612.9

(51) Int. Cl.
*H04L 45/16* (2022.01)
*H04L 45/12* (2022.01)
*H04L 45/00* (2022.01)

(52) U.S. Cl.
CPC .............. *H04L 45/16* (2013.01); *H04L 45/12* (2013.01); *H04L 45/14* (2013.01)

(58) Field of Classification Search
CPC .......... H04L 45/16; H04L 45/12; H04L 45/14
See application file for complete search history.

(56) References Cited

U.S. PATENT DOCUMENTS

| | | | |
|---|---|---|---|
| 2018/0131604 A1* | 5/2018 | Zhou | H04L 45/64 |
| 2022/0103458 A1* | 3/2022 | Margaria | H04L 41/0896 |
| 2022/0278920 A1* | 9/2022 | Yang | H04L 45/12 |
| 2022/0393969 A1* | 12/2022 | Eadala | H04L 45/14 |

FOREIGN PATENT DOCUMENTS

CN          112073321          2/2021

* cited by examiner

*Primary Examiner* — Luat Phung
(74) *Attorney, Agent, or Firm* — JCIP GLOBAL INC.

(57) ABSTRACT

A multicast routing method and an interconnection device for a mesh network system, a mesh network system and a configuration method thereof are provided. The method includes, at each internal interconnection device among multiple interconnection devices of each processing subsystem: in response to receiving a multicast access request to a destination memory, determining a shortest path from each internal interconnection device to the destination memory based on a topology structure of the mesh network system; where the internal interconnection device has no link connected to an external processing subsystem; in response to determining that the number of the shortest path is equal to one, routing the multicast access request to the destination memory along the shortest path; in response to determining that the number of the shortest path is greater than one, determining a next-hop interconnection device for the multicast access request based on a second static routing policy.

10 Claims, 5 Drawing Sheets

MULTICAST ROUTING METHOD, INTERCONNECTION DEVICE, MESH NETWORK SYSTEM AND CONFIGURATION METHOD THEREOF

CROSS-REFERENCE TO RELATED APPLICATION

This application claims the priority benefit of China application serial no. 202110811612.9, filed on Jul. 19, 2021. The entirety of the above-mentioned patent application is hereby incorporated by reference herein and made a part of this specification.

BACKGROUND

Technical Field

The disclosure generally relates to the field of multiprocessors, and in particular, relates to a multicast routing method for a mesh network system, an interconnection device of the mesh network system, the mesh network system, and a method of configuring the mesh network system.

Description of Related Art

In many fields that require rapid execution of a large number of operations, multi-processor systems have been extensively used. A typical multi-processor system includes a plurality of processors and a plurality of memories, which are connected together by an interconnection network formed by switches and physical transmission links. The plural processors usually execute the same program and access the same data in the memory in exactly the same order. For instance, in a parallel computing system in the field of artificial intelligence (AI) that performs model parallel processing on neural networks, multiple processors are programmed to read the same neural network model parameters from memory and use the parameters to process different batches of data. These processors read the same parameter data in exactly the same order.

However, in such a multi-processor system, if the processors are required to obtain specific data from a specific memory, each processor is required to read the data from the memory individually. In this way, the consumption of memory access bandwidth and network link bandwidth is many times greater than the bandwidth required by each individual processor, causing a huge burden on the entire network.

One way to solve the above problem is to add a cache at the memories. When specific data is read from the memories for the first time, the read data is stored in the cache. Subsequently, the read request for the data from other processors may be directly obtained from the cache without having to access the memories with lower bandwidth again. However, on the one hand, this method may only alleviate the bandwidth bottleneck of the low-speed memories, and may not solve the problem of link bandwidth consumption found in the entire network. On the other hand, the implementation costs of high-speed cache are high, but the data access bandwidth it can provide is only several times higher than that provided by the low-speed memories most of the time, and the amount of data that it can cache is 2-3 orders of amount lower than that of low-speed memories. Therefore, for applications such as neural network processing, this method cannot be used to completely solve the memory access bandwidth problem.

Another way to address the abovementioned problem is the introduction of general-purpose multicast write technology. One processor or multicast co-processor reads data from a specific memory, and then sends the data to a plurality of request processors through a multicast write operation. However, this method requires significant changes to the programming method of the multi-processor system. The processors are required to coordinate to initiate and complete data accessing. This significantly increases programming complexity and makes the programming model incompatible with existing software. In addition, if the interconnection network does not support multicast writing (for example, almost all on-chip interconnection networks do not support multicast writing), the transmission bandwidth consumption on the links of the interconnection network may not be reduced.

In view of the above problems, the right holder of the disclosure has proposed an interconnection device for an interconnection network in the prior patent (granted publication No.: CN112073321B). By configuring a dedicated request processing module and a response processing module in the interconnection device, the data access requests of the processors in the multicast group are merged and the response data is distributed to each request processor, and in this way, the memory access bandwidth consumption and the transmission bandwidth consumption on the interconnection network are reduced.

However, in the solution disclosed in the above patent, the entire interconnection network uses static routing, which in some cases may cause some links to be congested, and network performance may thus be lowered.

SUMMARY

In response to at least one of the above problems, the disclosure provides a multicast routing method for a mesh network system, an interconnection device for the mesh network system, and a method of configuring the mesh network system, which configures different routing policies for the interconnection devices according to whether these interconnection devices in each processing subsystem in the mesh network system are connected to an external processing subsystem, and in this way, the response data load of the links in each processing subsystem is balanced, and the network performance is improved.

According to one aspect of the disclosure, the disclosure provides a multicast routing method for a mesh network system. The mesh network system includes a plurality of processing subsystems and a plurality of memories, each processing subsystem includes a plurality of processors and a plurality of interconnection devices connected to the processors, and a first static routing policy is used for routing between the processing subsystems. The method includes the following steps. At each internal interconnection device among the interconnection devices of each processing subsystem: in response to receiving a multicast access request to a destination memory among the memories, a shortest path from each internal interconnection device to the destination memory is determined based on a topology structure of the mesh network system. The internal interconnection device has no link connected to an external processing subsystem. It is determined whether the number of the shortest path is greater than one. In response to determining that the number of the shortest path is equal to one, the multicast access request is routed to the destination memory along the shortest path. In response to determining that the number of the shortest path is greater than one, a next-hop interconnection device is determined for the multicast access request based on a second static routing policy, and the second static routing policy is different from the first static routing policy.

In some embodiments, the method further includes the following steps. At each external interconnection device among the interconnection devices of each processing subsystem, in response to receiving the multicast access request to the destination memory among the memories, the next-hop interconnection device from the external interconnection device to the destination memory along the shortest path is determined based on the topology structure of the mesh network system. Each external interconnection device has at least one link connected to an external processing subsystem. It is determined whether there is one or multiple next-hop interconnection devices. In response to determining that there is only one next-hop interconnection device, the multicast access request is routed to the next-hop interconnection device. In response to determining that there are multiple next-hop interconnection devices, it is determined whether the next-hop interconnection devices include another interconnection device located inside the processing subsystem. In response to determining that the next-hop interconnection devices include another interconnection device located inside the processing subsystem, the multicast access request is routed to the another interconnection device.

According to another aspect of the disclosure, the disclosure further provides an interconnection device for a mesh network system. The mesh network system includes a plurality of processing subsystems and a plurality of memories, each processing subsystem includes a plurality of processors and a plurality of interconnection devices connected to the processors, and a first static routing policy is used for routing between the processing subsystems. The interconnection device is further configured to perform the following operations. When the interconnection device has no link connected to an external processing subsystem, in response to receiving a multicast access request to a destination memory among the memories, a shortest path from the interconnection device to the destination memory is determined based on a topology structure of the mesh network system. It is determined whether the number of the shortest path is greater than one. In response to determining that the number of the shortest path is equal to one, the multicast access request is routed to the destination memory along the shortest path. In response to determining that the number of the shortest path is greater than one, a next-hop interconnection device is determined for the multicast access request based on a second static routing policy, and the second static routing policy is different from the first static routing policy.

In some embodiments, the interconnection device is further configured to perform the following steps. When the interconnection device has at least one link connected to the external processing subsystem, in response to receiving the multicast access request to the destination memory among the memories, the next-hop interconnection device from the interconnection device to the destination memory along the shortest path is determined based on the topology structure of the mesh network system. It is determined whether there is one or multiple next-hop interconnection devices. In response to determining that there is one next-hop interconnection device, the multicast access request is routed to the next-hop interconnection device. In response to determining that there are multiple next-hop interconnection devices, it is determined whether the next-hop interconnection devices include another interconnection device located inside the processing subsystem. In response to determining that the next-hop interconnection devices include another interconnection device located inside the processing subsystem, the multicast access request is routed to the another interconnection device.

According to still another aspect of the disclosure, the disclosure further provides a mesh network system. The mesh network system includes a plurality of processing subsystems and a plurality of memories, each processing subsystem includes a plurality of processors and a plurality of interconnection devices connected to the processors, and a first static routing policy is used for routing between the processing subsystems. The interconnection devices include internal interconnection devices and external interconnection devices, each internal interconnection device has no link connected to an external processing subsystem, and each external interconnection device has at least one link connected to the external processing subsystem. The internal interconnection device is configured to perform the following operations. In response to receiving a multicast access request to a destination memory among the memories, a shortest path from the internal interconnection device to the destination memory is determined based on a topology structure of the mesh network system. It is determined whether the number of the shortest path is greater than one. In response to determining that the number of the shortest path is equal to one, the multicast access request is routed to the destination memory along the shortest path. In response to determining that the number of the shortest path is greater than one, a next-hop interconnection device is determined for the multicast access request based on a second static routing policy, and the second static routing policy is different from the first static routing policy.

The external interconnection device is configured to perform the following operations. In response to receiving the multicast access request to the destination memory among the memories, the next-hop interconnection device from the external interconnection device to the destination memory along the shortest path is determined based on the topology structure of the mesh network system. It is determined whether there is one or multiple next-hop interconnection devices. In response to determining that there is only one next-hop interconnection device, the multicast access request is routed to the next-hop interconnection device. In response to determining that there are multiple next-hop interconnection devices, it is determined whether the next-hop interconnection devices include another interconnection device located inside the processing subsystem. In response to determining that the next-hop interconnection devices include another interconnection device located inside the processing subsystem, the multicast access request is routed to the another interconnection device.

According to yet another aspect of the disclosure, the disclosure further provides a method of configuring a mesh network system. The mesh network system includes a plurality of processing subsystems and a plurality of memories, each processing subsystem includes a plurality of processors and a plurality of interconnection devices connected to the processors, and a first static routing policy is used for routing between the processing subsystems. The method includes the following steps. It is determined whether an interconnection device among the interconnection devices is an internal interconnection device or an external interconnection device based on a topology structure of the mesh network system. The internal interconnection device has no link connected to an external processing subsystem, and the external interconnection device has at least one link connected to the external processing subsystem. In response to determining that the interconnection device is the internal interconnection device, the internal interconnection device is configured to perform the following operations. In response to receiving a multicast access request to a destination memory among the memories, a shortest path from the internal interconnection device to the destination memory is determined based on the topology structure of the mesh network system. It is determined whether the number of the shortest path is greater than one. In response to determining that the number of the shortest path is equal to one, the multicast access request is routed to the destination memory along the shortest path. In response to determining that the number of the shortest path is greater than one, a next-hop interconnection device is determined for the multicast access request based on a second static routing policy, and the second static routing policy is different from the first static routing policy. In response to determining that the interconnection device is the external interconnection device, the external interconnection device is configured to perform the following operations. In response to receiving the multicast access request to the destination memory among the memories, the next-hop interconnection device from the external interconnection device to the destination memory along the shortest path is determined based on the topology structure of the mesh network system. It is determined whether there is one or multiple next-hop interconnection devices. In response to determining that there is only one next-hop interconnection device, the multicast access request is routed to the next-hop interconnection device. In response to determining that there are multiple next-hop interconnection devices, it is determined whether the next-hop interconnection devices include another interconnection device located inside the processing subsystem. In response to determining that the next-hop interconnection devices include another interconnection device located inside the processing subsystem, the multicast access request is routed to the another interconnection device.

In some embodiments, the first static routing policy is one of a horizontal-vertical routing policy and a vertical-horizontal routing policy, and the second static routing policy is the other one of the horizontal-vertical routing policy and the vertical-horizontal routing policy.

BRIEF DESCRIPTION OF THE DRAWINGS

The disclosure will be better understood by referring to the description of the specific embodiments of the disclosure provided in the following drawings, and other purposes, details, features, and advantages of the disclosure will become more obvious.

DESCRIPTION OF THE EMBODIMENTS

Figure 1:
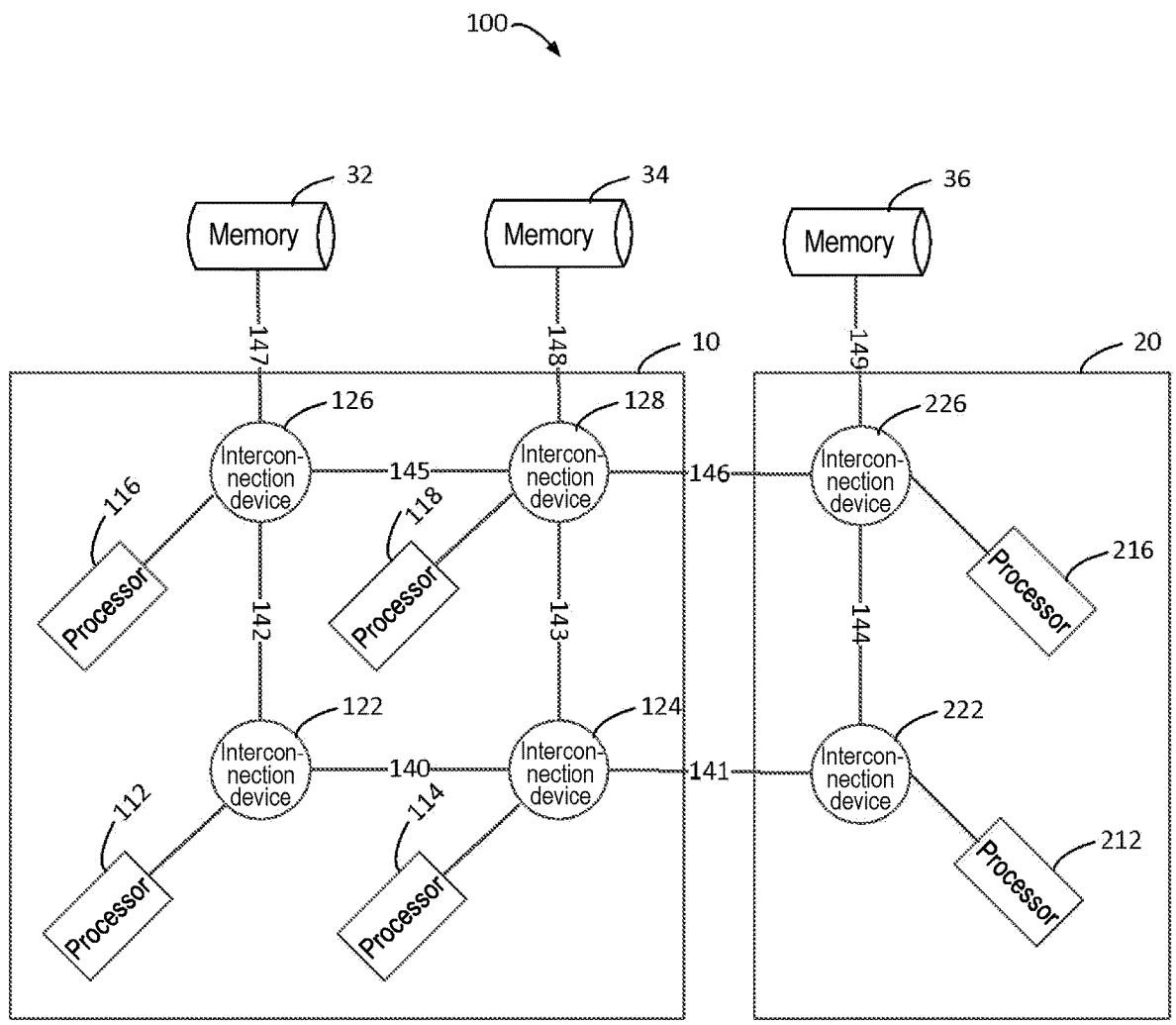
FIG. 1 is a schematic diagram illustrating a mesh network system.

Preferred embodiments of the disclosure will be described in detail with reference to the accompanying drawings hereinafter. Although the preferred embodiments of the disclosure are shown in the drawings, it should be understood that the disclosure may be implemented in various forms and should not be limited by the embodiments set forth herein. On the contrary, these embodiments are provided to make the disclosure more thorough and complete, and to fully convey the scope of the disclosure to a person having ordinary skill in the art.

The term "including" and its variants used in the specification means open-ended inclusion, that is, "including but not limited to". Unless specifically stated, the term "or" means "and/or". The term "based on" means "based at least in part on." The terms "one embodiment" and "some embodiments" mean "at least one exemplary embodiment". The term "another embodiment" means "at least one additional embodiment". The terms "first", "second", etc. may refer to different or the same objects.

In some cases, a portion of the processors in the entire network may be dedicated to executing specific applications, or a portion of the processors may be assigned to specific subjects for control and use. In this case, the processors in the network may be divided into multiple processing subsystems. The processors in these processing subsystems form a multicast group and share the same storage resources with other processing subsystems.

FIG. 1 is a schematic diagram illustrating a mesh network system 100. As shown in FIG. 1, the mesh network system 100 includes a plurality of processing subsystems (processing subsystems 10 and 20 are illustratively shown in FIG. 1) and a plurality of memories (memories 32, 34, and 36 are illustratively shown in FIG. 1). Each processing subsystem includes a plurality of processors and a plurality of interconnection devices connected to the processors. As shown in FIG. 1, the processing subsystem 10 includes processors 112, 114, 116, and 118 and interconnection devices 122, 124, 126, and 128 connected to these processors, and the processing subsystem 20 includes processors 212 and 216 and interconnection devices 222 and 226 connected to these processors. Physical links may be used between the processors and the interconnection devices, among the interconnection devices, and between the interconnection devices and the memories. Note that in FIG. 1, only physical links 140 to 149 among the interconnection devices and between the interconnection devices and the memories are numbered, and the numbering between the processors and the interconnection devices is omitted. Further, the numbers and connection relationships of processors and interconnection devices in each processing subsystem shown in FIG. 1 are also exemplary and are not intended to limit the scope of the disclosure.

Some or all processors in a processing subsystem may form a multicast group. The processors in the multicast group may initiate data access requests, referred to as multicast access requests, targeting at a target data unit in a destination memory (e.g., the memory 32, 34 or 36) at the same time. Each interconnection device may combine the multicast access requests of the processors of one multicast group into a unicast request to obtain the target data unit from the destination memory. This target data unit acting as response data may in turn be routed and multicasted by each interconnection device to each requesting processor.

In the static routing policy according to the related art, in order to complete the merging of multicast access requests inside each processing subsystem, the same static routing policy is required to be used for these multicast access requests. In this case, the response data from the memories 32, 34, and 36 may pass through the same link, link congestion may thereby occur and link performance may be reduced. For instance, assuming that the static routing policy used by the mesh network system 100 in FIG. 1 is vertical-horizontal static routing (i.e., y-x routing), in the processing subsystem 10, a multicast access request to the memory 32 by the processor 112 may reach the memory 32 from the interconnection device 122 through the links 142 and 147, and correspondingly, the response data from the memory 32 may reach the interconnection device 122 through the links 147 and 142. A multicast access request to the memory 34 by the processor 112 may reach the memory 34 from the interconnection device 122 through the links 142, 145, and 148, and correspondingly, the response data from the memory 34 may reach the interconnection device 122 through the links 148, 145, and 142. A multicast access request to the memory 36 by the processor 112 may reach the memory 36 from the interconnection device 122 through the links 142, 145, 146, and 149, and correspondingly, the response data from the memory 36 may reach the interconnection device 122 through the links 149, 146, 145, and 142.

It can be seen that on the link 142, there may be three pieces of response data from the memories 32, 34 and 36, while on the links 140, 141, 143, and 144 there is no response data. As such, the response data loads on different links are considerably different, and the network performance is thereby reduced.

In addition, the division of each processing subsystem is usually based on specific applications or users. For instance, as a resource provider, the owner of the mesh network system 100 may allocate different processing subsystems to it according to the needs of different clients. That is, different processing subsystems have different users. In this case, the multicast access requests from the multicast groups in a processing subsystem need to be merged inside the processing subsystem.

In view of the above problems, the disclosure provides a multicast routing method for a mesh network system, in which different routing policies are configured for interconnection devices in each processing subsystem according to the different connection relationships (whether they are connected to an external processing subsystem) of the interconnection devices. In this way, the response data load of the links in each processing subsystem is balanced, the multicast access requests in one processing subsystem may be merged in the processing subsystem, and network performance may thus be improved.

To be specific, in the mesh network system 100 as shown in FIG. 1, the original static routing policy (hereinafter referred to as the first static routing policy) is still used for data routing among the processing subsystems. At each interconnection device inside each processing subsystem, different routing policies are used based on whether the individual interconnection device is connected to an external processing subsystem. These routing policies may be initialized at the mesh network system 100, for example, or may be configured by a higher-layer controller (e.g., a main CPU (Central Processing Unit)) when the overall topology structure of the mesh network system 100 or the division mode of the processing subsystems is changed (the overall topology structure of the mesh network system 100 and the division method of the processing subsystems therein are collectively referred to as the topology structure of the mesh network system 100), so that each interconnection device executes a corresponding multicast routing method when receiving a multicast access request.

Before configuring the routing method of each interconnection device, it may be determined whether an interconnection device is an internal interconnection device or an external interconnection device based on the topology structure of the mesh network system 100. Here, an internal interconnection device refers to an interconnection device that has no link connected to an external processing subsystem, and an external interconnection device refers to an interconnection device (also referred to as an edge interconnection device) that has at least one link connected to an external processing subsystem. In the specification, any other processing subsystem other than the processing subsystem (which may also be referred to as a local processing subsystem) to which one interconnection device belongs may be referred to as an external processing subsystem.

For instance, in the mesh network system 100 as shown in FIG. 1, in the processing subsystem 10, the interconnection device 122 has three links. The link 140 is connected to the interconnection device 124 inside the same processing subsystem 10, and the link 142 is connected to the interconnection device 126 inside the same processing subsystem 10 and is further connected to the processor 112 inside the same processing subsystem 10 through another link. That is, interconnection device 122 has no link connected to an external processing subsystem, and therefore, the interconnection device 122 may be determined to be an internal interconnection device. Similarly, in the processing subsystem 10, the interconnection device 126 has four links. The link 142 is connected to the interconnection device 122 inside the same processing subsystem 10, the link 145 is connected to the interconnection device 128 inside the same processing subsystem 10, and the link 147 is connected to the memory 32 and is further connected to the processor 116 inside the same processing subsystem 10 through another link. That is, interconnection device 126 also has no link connected to other processing subsystems, and therefore, the interconnection device 126 may be determined to be an internal interconnection device.

As other instance, in the processing subsystem 10, the interconnection device 124 has four links. The links 140 and 143 are respectively connected to the interconnection devices 122 and 128 inside the same processing subsystem 10, and the link 141 is connected to the interconnection device 222 inside the other processing subsystem 20 and is connected to the processor 114 inside the same processing subsystem 10 through another link. That is, interconnection device 124 has one link connected to the external processing subsystem 20, and therefore, the interconnection device 124 may be determined to be an external interconnection device. Similarly, the interconnection device 128 may also be determined as an external interconnection device.

Figure 2:
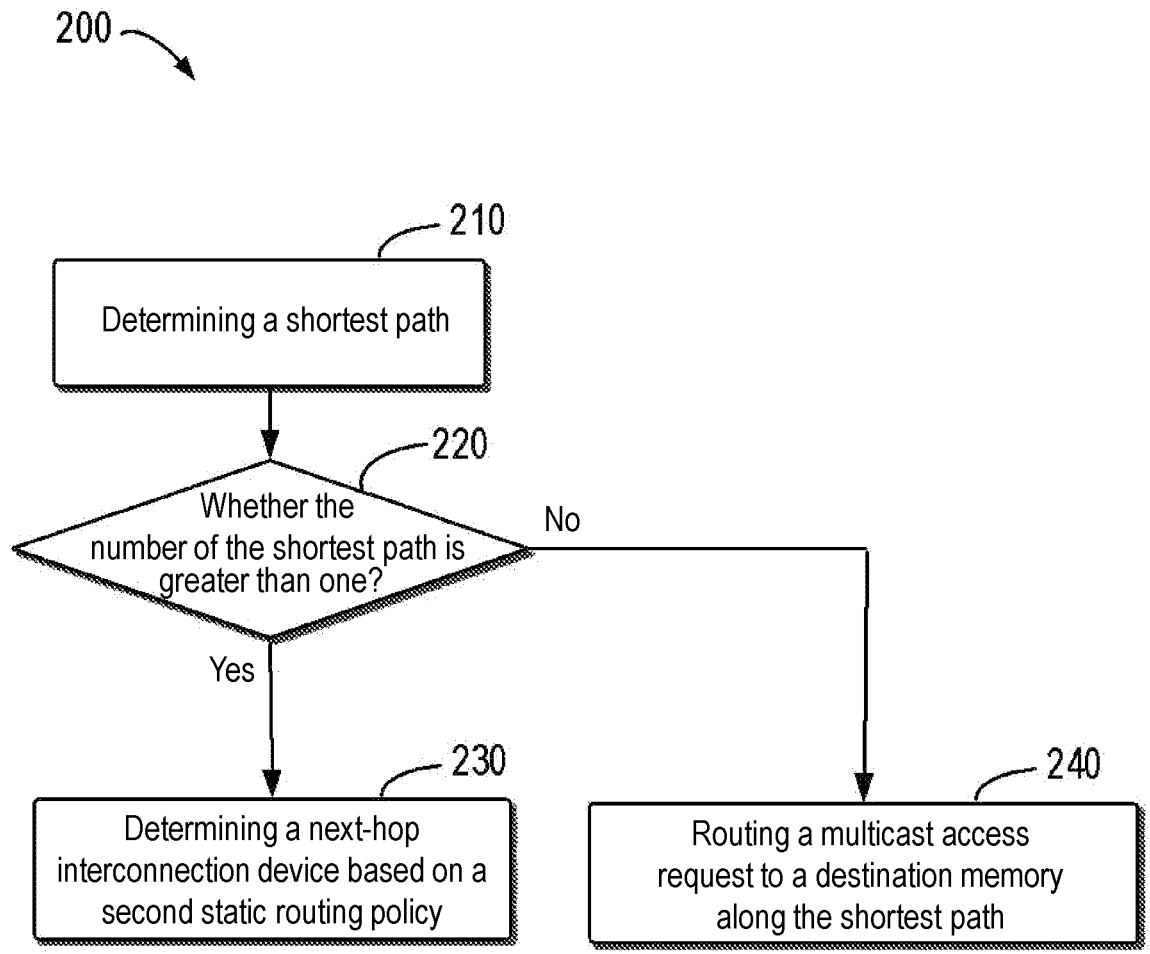
FIG. 2 is a flow chart illustrating a multicast routing method for the mesh network system according to some embodiments of the disclosure.

FIG. 2 is a flow chart illustrating a multicast routing method 200 for the mesh network system 100 according to some embodiments of the disclosure. The multicast routing method 200 is performed by internal interconnection devices (e.g., interconnection devices 122 and 126) upon receipt of a multicast access request. The multicast routing method 200 is be described below by taking the internal interconnection device 122 as an example.

As shown in FIG. 2, in step 210, when a multicast access request to a destination memory among the memories 32, 34, and 36 is received, the internal interconnection device 122 may determine a shortest path from the internal interconnection device 122 to the destination memory based on the topology structure of the mesh network system 100. For instance, as shown in FIG. 1, if the destination memory for the multicast access request is the memory 32, the shortest path from the internal interconnection device 122 to the destination memory 32 is through the links 142 and 147 to memory 32. If the destination memory for the multicast access request is the memory 34, the shortest path from the internal interconnection device 122 to the destination memory 34 is through the links 142, 145, and 148 to memory 34 or through the links 140, 143, and 148 to the memory 34.

In step 220, the internal interconnection device 122 may determine whether the number of the shortest path obtained in step 210 is greater than one. As described above, in the case where the destination memory is the memory 32, the number of the shortest path is equal to one, and in the case where the destination memory is the memory 34, the number of the shortest paths is equal to two.

If it is determined that the number of the shortest paths determined in step 210 is greater than one ("Yes" is determined in step 220), in step 230, the internal interconnection device 122 may determine a next-hop interconnection device for the multicast access request based on a second static routing policy.

Here, instead of using the same static routing policy for the entire mesh network system 100 as previously described, the second static routing policy used in step 230 is different from the first static routing policy used to handle routing among the subsystems. For instance, assuming that the first static routing policy is a vertical-horizontal routing policy (also referred to as y-x routing), that is, the multicast access request is first transmitted vertically and then horizontally, the second static routing policy may thus be a horizontal-vertical routing policy (also referred to as x-y routing), that is, the multicast access request is first transmitted horizontally and then vertically. In this case, in the case where the destination memory is the memory 34, the internal interconnection device 122 may determine the path from the internal interconnection device 122 to the destination memory 34 to be through the links 140, 143, and 148 to the destination memory 34 based on the second static routing policy, and it may thus be determined that the next-hop interconnection device for the multicast access request is the interconnection device 124 through the link 140.

When there are multiple shortest paths, by selecting different routing policies at the internal interconnection devices, the load on each link may be balanced, and the conflict of multiple pieces of response data on the same link may be avoided.

On the other hand, if it is determined that the number of the shortest paths determined in step 210 is equal to one ("No" is determined in step 220), in step 240, the internal interconnection device 122 may route the multicast access request to the destination memory along the shortest path.

For example, in the case where the destination memory is the memory 32, the shortest path is through the links 142 and 147 to the destination memory 32, i.e., the number of shortest paths is equal to one. In this case, the internal interconnection device 122 may route the received multicast access request to the destination memory 32 along the shortest path.

Here, the shortest path may conform to the first static routing policy or may conform to the second static routing policy. That is, in this case, the first static routing policy may still satisfy the routing and merging needs of the multicast access request, and therefore, the routing policy used herein is not limited to the first or the second static routing policy.

In this way, the routing policy of the internal interconnection devices in the processing subsystems may be made flexible, so that the response data returned according to the same path is distributed evenly on each link.

Figure 3:
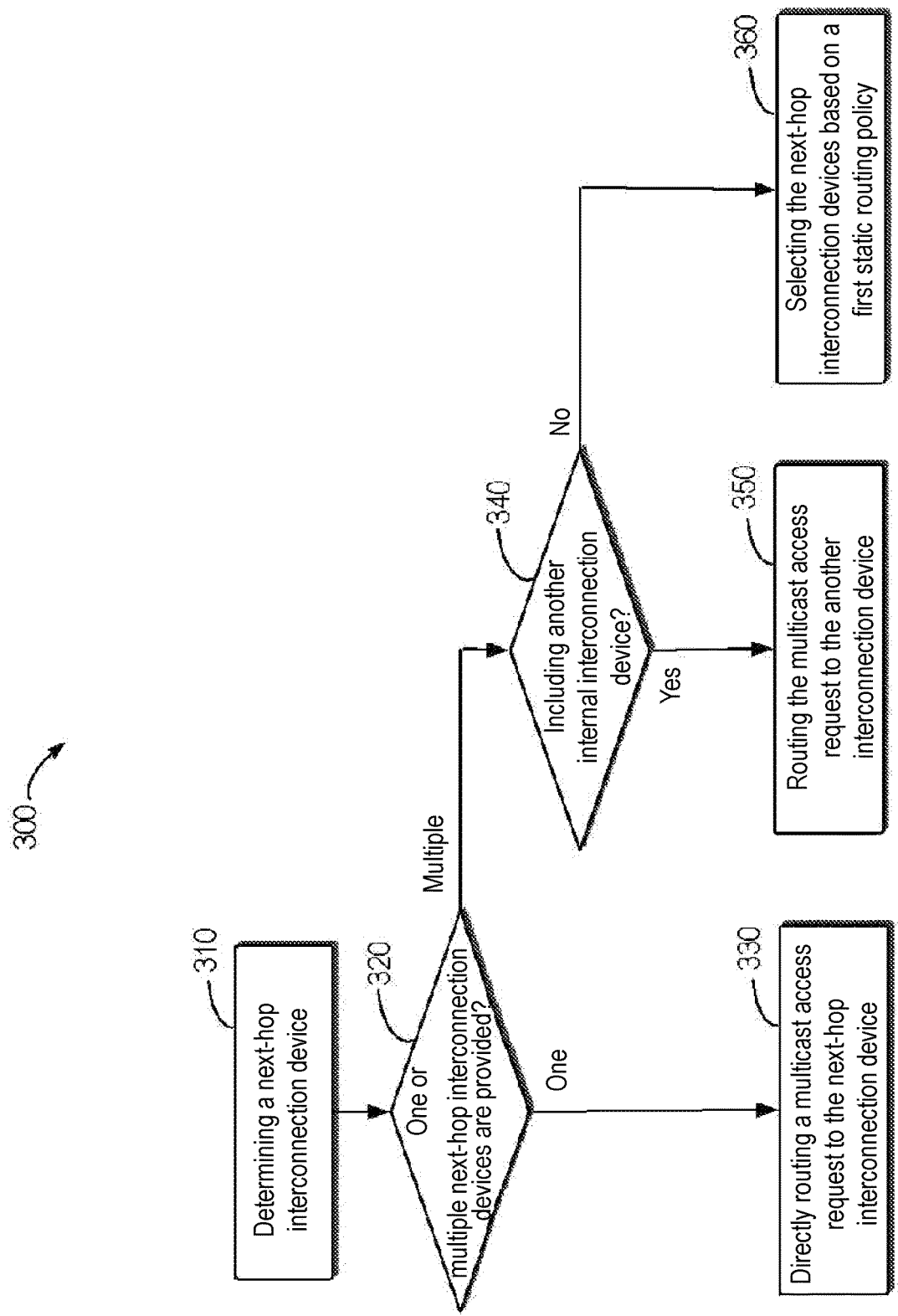
FIG. 3 is a flow chart illustrating a multicast routing method for the mesh network system according to some other embodiments of the disclosure.

FIG. 3 is a flow chart illustrating a multicast routing method 300 for the mesh network system 100 according to some other embodiments of the disclosure. The multicast routing method 300 may be performed by external interconnection devices (e.g., interconnection devices 124 and 128) upon receipt of a multicast access request. The multicast routing method 300 is be described below by taking the external interconnection device 124 as an example. Note that although the multicast routing method 300 and the multicast routing method 200 are described separately herein, a person having ordinary skill in the art can understand that the multicast routing method 300 may be combined with the multicast routing method 200 for the entire mesh network system 100.

As shown in FIG. 3, in step 310, when a multicast access request to a destination memory among the memories 32, 34, and 36 is received, the external interconnection device 124 may determine the next-hop internal interconnection device from the external interconnection device 124 to the destination memory along the shortest path based on the topology structure of the mesh network system 100. For instance, as shown in FIG. 1, if the destination memory for the multicast access request is the memory 34, the next-hop interconnection device along the shortest path from external interconnection device 124 to the destination memory 34 is the interconnection device 128. If the destination memory for the multicast access request is the memory 36, the next-hop interconnection device along the shortest path from external interconnection device 124 to the destination memory 36 is the interconnection device 128 or the interconnection device 222, that is, there are two shortest paths from the external interconnection device 124 to the destination memory 36.

In step 320, the external interconnection device 124 may determine whether the number of the next-hop interconnection device obtained in step 310 is one or multiple. As described above, in the case where the destination memory is the memory 34, the number of the next-hop interconnection device is one, and in the case where the destination memory is the memory 36, the number of the next-hop interconnection device is two.

If it is determined that only one next-hop interconnection device is provided ("One" is determined in step 320), in step 330, the external interconnection device 124 may directly route the multicast access request to the next-hop interconnection device. For instance, if the destination memory is the memory 34, the external interconnection device 124 may directly route the multicast access request to the next-hop interconnection device 128.

On the other hand, if it is determined that multiple next-hop interconnection devices are provided ("Multiple" is determined in step 320), in step 340, the external interconnection device 124 may further determine whether the next-hop interconnection devices include another interconnection device located inside the local processing subsystem 10.

For instance, if the destination memory is the memory 36, the next-hop interconnection devices of the external interconnection device 124 include the interconnection device 128 inside the processing subsystem 10 and the interconnection device 222 inside the processing subsystem 20. That is, another interconnection device 128 located inside the local processing subsystem 10 is included.

In this case, in step 350, the external interconnection device 124 may route the multicast access request to the another interconnection device 128. In this way, the multicast access request may be merged at the another interconnection device 128 with other multicast access requests of the multicast group for the same target data unit to the same destination memory.

On the other hand, if the multiple next-hop interconnection devices do not include another interconnection device located inside the local processing subsystem 10 ("No" is determined in step 240), that is, the next-hop interconnection devices are all interconnection devices in the external processing subsystem, then in step 360, the external interconnection device 124 may select the next-hop interconnection device among the multiple next-hop interconnection devices based on the first static routing policy.

Note that although the method 300 is described above in together with an external interconnection device, in some embodiments of the disclosure, any interconnection device in the processing subsystem may perform the above-described method 300. That is, when forwarding the multicast access request, the interconnection device may determine whether the next-hop interconnection device is an interconnection device that may receive multicast access requests from other processors in the multicast group, and when determining that the next-hop interconnection device may receive other multicast access requests, the interconnection device forwards the received multicast access request to the next-hop interconnection device.

In this way, the multicast access requests of a multicast group may be combined in one processing subsystem to achieve multicast data access. This is especially advantageous when different processing subsystems have different users.

Through the above multicast routing method, assuming that the first static routing policy is y-x routing and the second static routing policy is x-y routing, the multicast access request to the memory 32 by the processor 112 in the processing subsystem 10 may reach the memory 32 from the interconnection device 122 through the links 142 and 147. Accordingly, the response data from the memory 32 may reach interconnection device 122 through the links 147 and 142. A multicast access request to the memory 34 by the processor 112 may reach the memory 34 from the interconnection device 122 through the links 140, 143, and 148, and correspondingly, the response data from the memory 34 may reach the interconnection device 122 through the links 148, 143, and 140. A multicast access request to the memory 36 by the processor 112 may reach the memory 36 from the interconnection device 122 through the links 140, 143, 146, and 149, and correspondingly, the response data from the memory 36 may reach the interconnection device 122 through the links 149, 146, 143, and 140.

Figure 4:
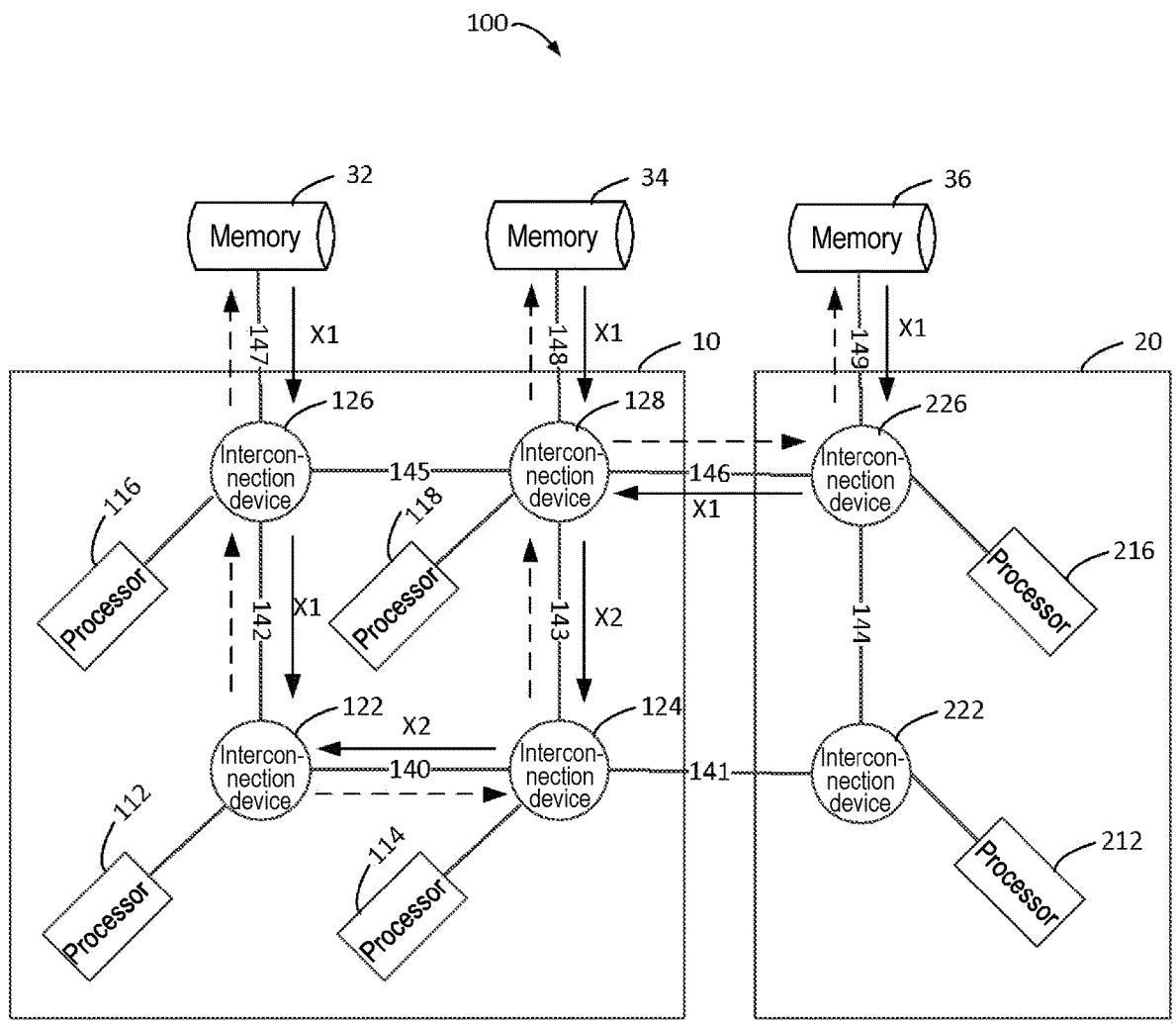
FIG. 4 is a schematic diagram illustrating data flow of the mesh network system according to an embodiment of the disclosure.

FIG. 4 is a schematic diagram illustrating data flow of the mesh network system 100 according to an embodiment of the disclosure. The dotted lines with arrows indicate the flow of the multicast access request, the solid lines with arrows indicate the flow of the response data to the multicast access request, and the numbers (X1 and X2) next to the solid lines with arrows indicate the amount of response data on the links. It can be seen that only one piece of response data is provided on each of the links 142 and 146, and a maximum of two pieces of response data are provided on each of the links 140 and 143. Therefore, compared with the aforementioned static routing policy, the load of response data on each link is more balanced.

The method of the disclosure is described above by taking the example that the first static routing policy is y-x routing and the second static routing policy is x-y routing. However, a person having ordinary skill in the art can understand that the disclosure is not limited thereto, the first static routing policy may also be x-y routing, and correspondingly, the second static routing policy may be y-x routing. Alternatively, the first static routing policy and the second static routing policy may also be set as other static routing policies, as long as the two are different and it can be ensured that multicast request merging may be completed in this processing subsystem. In addition, under different network topologies or division methods of processing subsystems, if a static routing policy may ensure that the merging of multicast requests is completed inside one processing subsystem, the same routing policy may be used both inside the processing subsystem and between the processing subsystems.

Figure 5:
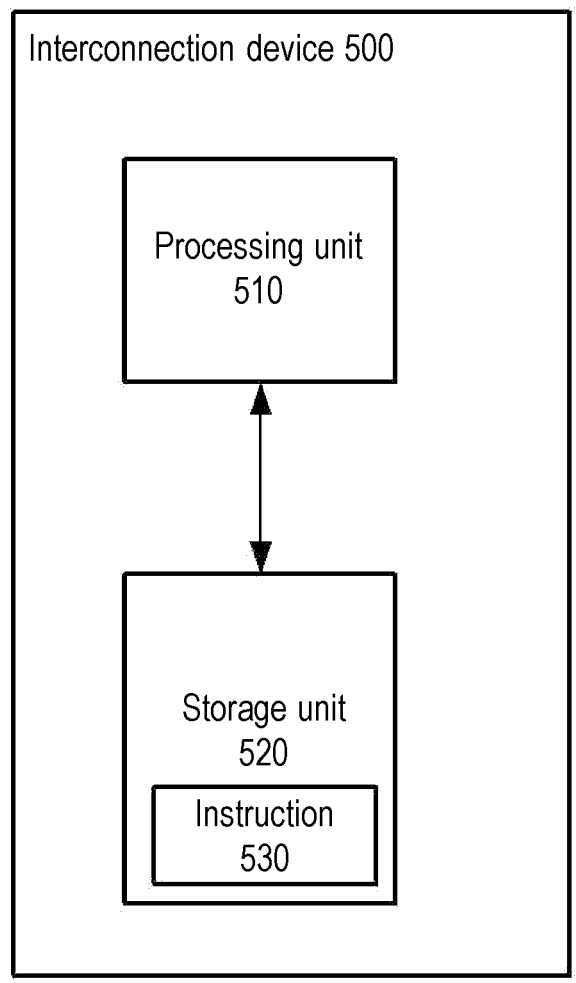
FIG. 5 is a schematic diagram illustrating a structure of an interconnection device according to some embodiments of the disclosure.

FIG. 5 is a schematic diagram illustrating a structure of an interconnection device 500 according to some embodiments of the disclosure. The interconnection device 500 may be the interconnection device 122, 124, 126, 128, 222, or 226 as described above.

As shown in FIG. 5, the interconnection device 500 may include one or more processing units 510. The processing unit 510 controls the operations and functions of the interconnection device 500. For instance, in some embodiments, the processing unit 510 may perform various operations by means of instructions 530 stored in one or a plurality of storage units 520 coupled thereto. The storage unit 520 may be of any suitable type applicable for the local technical environment and may be implemented using any suitable data storage technology, including but not limited to semiconductor-based storage devices, magnetic storage devices and systems, and optical storage devices and systems. Although only one processing unit 510 and one storage unit 520 are shown in FIG. 5, there may be more physically different processing units 510 and storage units 520 in the interconnection device 500.

The processing unit 510 may be of any suitable type applicable for the local technical environment and may include, but is not limited to, a microprocessor, a digital signal processor (DSP), field-programmable gate array (FPGA), and the like.

When the interconnection device 500 is used to execute the solution according to the disclosure, the processing unit 510 may be configured (be configured by an instruction 530 in the storage unit 520, for example) to implement the functions of the method 200 and/or 300 described above with reference to FIG. 2 and/or FIG. 3. All the features described above with reference to FIG. 2 to FIG. 3 are applicable to the interconnection device 500, and description thereof is not repeated herein.

The multicast routing method for the mesh network system, the interconnection devices, the mesh network system, and the configuration method thereof according to the disclosure are described above together with FIG. 1 to FIG. 5. The above description only focuses on the description of the routing method in the mesh network system or the interconnection devices and omits the description of the process of combining multicast access requests and the process of distributing response data. Regarding the latter, reference may be made to the prior patent of the right holder of the disclosure (granted publication No.: CN112073321B).

A person having ordinary skill in the art can understand that the method steps described herein are not limited to the order shown exemplarily in the drawings, but can be executed in any other feasible order.

In one or more exemplary designs, hardware, software, firmware, or any combination thereof may be used to implement the functions described in the disclosure. For instance, if implementation is performed by software, the functions can be stored as one or more instructions or codes on a computer-readable medium, or transmitted as one or more instructions or codes on the computer-readable medium.

The various components of the interconnection devices disclosed herein may be implemented using discrete hardware components or may be integrated on one hardware component. For instance, a general-purpose processor, a digital signal processor (DSP), an application-specific integrated circuit (ASIC), a field programmable gate array (FPGA) or other programmable logic devices, discrete gates or transistor logics, discrete hardware components, or any combination used to perform the functions described herein may be used to implement or execute various exemplary logic blocks, modules, and circuits described in combination with the disclosure.

A person having ordinary skill in the art should also understand that the various exemplary logic blocks, modules, circuits, and algorithm steps described in combination with the embodiments of the disclosure may be implemented as electronic hardware, computer software, or a combination of both.

The above description of the disclosure is used to enable any person having ordinary skill in the art to implement or use the disclosure. Various modifications of the disclosure are obvious to a person having ordinary skill in the art, and the general principles defined herein may also be applied to other modifications without departing from the spirit and protection scope of the disclosure. Therefore, the disclosure is not limited to the examples and designs described herein, but is consistent with the broadest scope of the principles and novel features disclosed herein.

What is claimed is:

1. A multicast routing method for a mesh network system, wherein the mesh network system comprises a plurality of processing subsystems and a plurality of memories, each processing subsystem comprises a plurality of processors and a plurality of interconnection devices connected to the processors, a first static routing policy is used for routing between the processing subsystems, and the method comprises, at each internal interconnection device among the interconnection devices of each processing subsystem:
   in response to receiving a multicast access request to a destination memory among the memories, determining a shortest path from each internal interconnection device to the destination memory based on a topology structure of the mesh network system, wherein the internal interconnection device has no link connected to an external processing subsystem;
   determining whether a number of the shortest path is greater than one;
   in response to determining that the number of the shortest path is equal to one, routing the multicast access request to the destination memory along the shortest path; and
   in response to determining that the number of the shortest path is greater than one, determining a next-hop interconnection device for the multicast access request based on a second static routing policy, wherein the second static routing policy is different from the first static routing policy.

2. The multicast routing method according to claim 1, further comprising, at each external interconnection device among the interconnection devices of each processing subsystem:
   in response to receiving the multicast access request to the destination memory among the memories, determining the next-hop interconnection device from the external interconnection devices to the destination memory along the shortest paths based on the topology structure of the mesh network system, wherein each external interconnection device has at least one link connected to an external processing subsystem;
   determining whether there is only one next-hop interconnection device or there are multiple next-hop interconnection devices;
   in response to determining that there is only one next-hop interconnection device, routing the multicast access request to the next-hop interconnection device;
   in response to determining that there are multiple next-hop interconnection devices, determining whether the next-hop interconnection devices comprise another interconnection device located inside the processing subsystem; and
   in response to determining that the next-hop interconnection devices comprise another interconnection device located inside the processing subsystem, routing the multicast access request to the another interconnection device.

3. The multicast routing method according to claim 1, wherein the first static routing policy is one of a horizontal-vertical routing policy and a vertical-horizontal routing policy, and the second static routing policy is the other one of the horizontal-vertical routing policy and the vertical-horizontal routing policy.

4. An interconnection device for a mesh network system, wherein the mesh network system comprises a plurality of processing subsystems and a plurality of memories, each processing subsystem comprises a plurality of processors and a plurality of interconnection devices connected to the processors, a first static routing policy is used for routing between the processing subsystems, and each of the interconnection devices is configured for:
   when the interconnection device has no link connected to an external processing subsystem, in response to receiving a multicast access request to a destination memory among the memories, determining a shortest path from the interconnection device to the destination memory based on a topology structure of the mesh network system;
   determining whether a number of the shortest path is greater than one;
   in response to determining that the number of the shortest path is equal to one, routing the multicast access request to the destination memory along the shortest path; and
   in response to determining that the number of the shortest path is greater than one, determining a next-hop interconnection device for the multicast access request based on a second static routing policy, wherein the second static routing policy is different from the first static routing policy.

5. The interconnection device according to claim 4, wherein the interconnection device is further configured for:

when each interconnection device has at least one link connected to the external processing subsystem, in response to receiving the multicast access request to the destination memory among the memories, determining the next-hop interconnection device from the interconnection device to the destination memory along the shortest path based on the topology structure of the mesh network system;

determining whether there is only one next-hop interconnection device or there are multiple next-hop interconnection devices;

in response to determining that there is only one next-hop interconnection device, routing the multicast access request to the next-hop interconnection device;

in response to determining that there are multiple next-hop interconnection devices, determining whether the next-hop interconnection devices comprise another interconnection device located inside the processing subsystem; and in response to determining that the next-hop interconnection devices comprise another interconnection device located inside the processing subsystem, routing the multicast access request to the another interconnection device.

6. The interconnection device according to claim 4, wherein the first static routing policy is one of a horizontal-vertical routing policy and a vertical-horizontal routing policy, and the second static routing policy is the other one of the horizontal-vertical routing policy and the vertical-horizontal routing policy.

7. A mesh network system, wherein the mesh network system comprises a plurality of processing subsystems and a plurality of memories, each processing subsystem comprises a plurality of processors and a plurality of interconnection devices connected to the processors, a first static routing policy is used for routing between the processing subsystems, the interconnection devices comprise internal interconnection devices and external interconnection devices, each internal interconnection device has no link connected to an external processing subsystem, and each external interconnection device has at least one link connected to the external processing subsystem, wherein
the internal interconnection device is configured for:
in response to receiving a multicast access request to a destination memory among the memories, determining a shortest path from the internal interconnection device to the destination memory based on a topology structure of the mesh network system;
determining whether a number of the shortest path is greater than one;
in response to determining that the number of the shortest path is equal to one, routing the multicast access request to the destination memory along the shortest path; and
in response to determining that the number of the shortest path is greater than one, determining a next-hop interconnection device for the multicast access request based on a second static routing policy, wherein the second static routing policy is different from the first static routing policy, wherein
the external interconnection device is configured for:
in response to receiving the multicast access request to the destination memory among the memories, determining the next-hop interconnection device from the external interconnection device to the destination memory along the shortest path based on the topology structure of the mesh network system;

determining whether there is only one next-hop interconnection device or there are multiple next-hop interconnection devices;

in response to determining that there is only one next-hop interconnection device, routing the multicast access request to the next-hop interconnection device;

in response to determining that there are multiple next-hop interconnection devices, determining whether the next-hop interconnection devices comprise another interconnection device located inside the processing subsystem; and in response to determining that the next-hop interconnection devices comprise another interconnection device located inside the processing subsystem, routing the multicast access request to the another interconnection device.

8. The mesh network system according to claim 7, wherein the first static routing policy is one of a horizontal-vertical routing policy and a vertical-horizontal routing policy, and the second static routing policy is the other one of the horizontal-vertical routing policy and the vertical-horizontal routing policy.

9. A method of configuring a mesh network system, wherein the mesh network system comprises a plurality of processing subsystems and a plurality of memories, each processing subsystem comprises a plurality of processors and a plurality of interconnection devices connected to the processors, a first static routing policy is used for routing between the processing subsystems, and the method comprises:
determining whether an interconnection device among the interconnection devices is an internal interconnection device or an external interconnection device based on a topology structure of the mesh network system, wherein the internal interconnection device has no link connected to an external processing subsystem, and the external interconnection device has at least one link connected to the external processing subsystem;
in response to determining that the interconnection device is the internal interconnection device, configuring the internal interconnection device for:
in response to receiving a multicast access request to a destination memory among the memories, determining a shortest path from the internal interconnection device to the destination memory based on the topology structure of the mesh network system;
determining whether the number of the shortest path is greater than one;
in response to determining that the number of the shortest path is equal to one, routing the multicast access request to the destination memory along the shortest path; and
in response to determining that the number of the shortest path is greater than one, determining a next-hop interconnection device for the multicast access request based on a second static routing policy, wherein the second static routing policy is different from the first static routing policy; and
in response to determining that the interconnection device is the external interconnection device, configuring the external interconnection device for:
in response to receiving the multicast access request to the destination memory among the memories, determining the next-hop interconnection device from the external interconnection device to the destination memory along the shortest path based on the topology structure of the mesh network system;

determining whether there is only one next-hop interconnection device or there are multiple next-hop interconnection devices;

in response to determining that there is only one next-hop interconnection device, routing the multicast access request to the next-hop interconnection device;

in response to determining that there are multiple next-hop interconnection devices, determining whether the next-hop interconnection devices comprise another interconnection device located inside the processing subsystem; and in response to determining that the next-hop interconnection devices comprise another interconnection device located inside the processing subsystem, routing the multicast access request to the another interconnection device.

10. The method according to claim 9, wherein the first static routing policy is one of a horizontal-vertical routing policy and a vertical-horizontal routing policy, and the second static routing policy is the other one of the horizontal-vertical routing policy and the vertical-horizontal routing policy.

\* \* \* \* \*